(12) United States Patent
Henderson

(10) Patent No.: US 6,247,493 B1
(45) Date of Patent: Jun. 19, 2001

(54) MINIATURE PULSATILE FLOW CONTROLLER

(76) Inventor: Richard C. Henderson, 8886 Wine Valley Cir., San Jose, CA (US) 95135

( * ) Notice: Subject to any disclaimer, the term of this patent is extended or adjusted under 35 U.S.C. 154(b) by 0 days.

(21) Appl. No.: 09/521,298

(22) Filed: Mar. 9, 2000

(51) Int. Cl.[7] ............... F16K 31/02; H01H 61/06; H01H 71/18
(52) U.S. Cl. ............... 137/487.5; 137/12; 251/129.05
(58) Field of Search ................... 137/12, 487.5, 137/613, 883; 251/129.05, 129.08

(56) References Cited

U.S. PATENT DOCUMENTS

| | | | |
|---|---|---|---|
| 4,658,855 | 4/1987 | Doyle | 137/468 |
| 4,706,703 * | 11/1987 | Takeuschi et al. | 137/487.5 |
| 4,842,017 | 6/1989 | Reynolds | 137/601 |
| 5,038,821 * | 8/1991 | Maget | 137/487.5 |
| 5,061,914 | 10/1991 | Busch et al. | 337/140 |
| 5,082,242 | 1/1992 | Bonne et al. | 251/129.01 |
| 5,176,358 * | 1/1993 | Bonne et al. | 251/30.05 |
| 5,323,999 | 6/1994 | Bonne et al. | 251/11 |
| 5,325,880 | 7/1994 | Johnson et al. | 137/1 |
| 5,354,032 | 10/1994 | Sims et al. | 251/129.06 |
| 5,388,984 | 2/1995 | Meslif | 431/12 |
| 5,417,235 * | 5/1995 | Wise et al. | 137/1 |
| 5,487,378 * | 1/1996 | Robertson et al. | 128/200.16 |
| 6,032,689 * | 3/2000 | Tsai et al. | 137/487.5 |
| 6,062,256 * | 5/2000 | Miller et al. | 137/487.5 |

* cited by examiner

Primary Examiner—John Rivell
Assistant Examiner—Ramesh Krishnamurthy
(74) Attorney, Agent, or Firm—Thomas Schneck

(57) ABSTRACT

A miniature flow controller housing a fluid inlet and a fluid outlet, with the inlet pressure exceeding the outlet pressure. The outlet has orifices defined in a crystalline silicon membrane, along crystal planes of the silicon so that the geometry of the orifices is precisely known. The inlet and outlet are throttled by poppets which can seal the orifices on command of a device controller. The poppets are driven by shape retentive membranes which have two states, an open state and a closed state with a state change caused by application of small amounts of current to a resistive element in contact with the membrane. Rapid actuation of the poppets causes operation of the valve in a pulse mode. Where the fluid is a gas, pressure and temperature transducers measure conditions inside of the housing for application of gas law principles. By recording instantaneous pressure and temperature in the chamber, as the poppets are actuated, mass flow through the outlet orifices of the chamber is computed.

18 Claims, 3 Drawing Sheets

MINIATURE PULSATILE FLOW CONTROLLER

TECHNICAL FIELD

The invention relates to mass flow controllers and, in particular, to highly accurate flow rate controllers for gases.

BACKGROUND ART

The control of flow for liquids and gases is a major problem in various manufacturing processes. Certain industries, notably the manufacture of silicon wafers, require very accurate gas flow rates, for many different gas species and with precise start flow and end flow points.

There have been a number of responses to the industry's need for accurate flow controllers. The prevalent type senses gas flow by measuring the thermal properties of gas flow over sensor elements. See for example, U.S. Pat. No. 4,658,855 to Doyle. The sensor flow measurement is combined with the control of a valve to proportionally enlarge or decrease the cross sectional area of the passageway through the valve and thereby control the flow of gas. If the sensor detects that the measured flow differs compared to the desired or set point flow, then a controller will partially close or open the valve until the measured flow equals the set point flow.

Although such control devices have resulted in acceptable products there is a need for a more universally applicable approach. The difficulty with the present methods arises because the thermal sensors used in such devices are quite dependent upon the heat transport properties of the gas species involved. The second is the difficulty associated with controlling the cross-sectional area of a valve opening for flow control. Minute changes in area result in substantial changes in flow imposing a need for a highly accurate method of valve opening. In practice, this means restricting the operations of the controllers to near their maximum displacement of the valve opening, which constitutes the smallest possible fraction of the valve area. Furthermore, for any given valve there is a relatively restricted range of flow over which changing the cross-sectional area is effective. The result of these restrictions is the widespread use of many different flow controllers each set up for a particular gas and maximum flow. However, they are largely non-interchangeable.

There are further difficulties inherent in the flow sensing concept of flow control. There has to be some flow to measure and this creates the "overshoot" problem wherein during the first few moments of flow after flow start, the actual flow will differ from the set point flow until the controller has had time to adjust the system. There is also the potential problem of oscillation wherein the inherent minimal adjustment of the controller might lag the measured flow. In such a situation the flow may oscillate between high and low states compared to the set point flow. Ideally this dampens out quickly to the set point flow but in any case magnifies the time period of the overshoot problem. In the worst case, oscillation drives the valve opening/closing sequence to a widely uncontrolled situation.

An objective of the invention was to provide an improved highly accurate flow rate controller, especially for small volumes of gas used in scientific, biomedical and engineering applications.

SUMMARY OF THE INVENTION

The above objective has been achieved in a mass flow controller using valves operated in a pulse mode. A housing is provided with one inlet valve, an inlet orifice, and at least one outlet valve and outlet orifice. The valves have poppets operating to close orifices etched through a silicon substrate, a material allowing the size of the orifices to be precisely known. Each poppet is enclosed in a bellows within the housing so that the poppets are protected from the gas in the housing. Each poppet is actuated by a shape retentive membrane, deformable in response to heat, either opening or closing the respective orifice. The temperature and pressure in the housing are measured so that real time control of the poppets by a controller will result in a known mass flow through the outlet apertures.

The controller modulates gas pressure at the gas inlet orifice about a set point so that pulses of gas enter the housing. At the same time, the controller monitors gas pressure at the outlet orifice, also about the set point, as gas exits the housing. The controller coordinates the duration of the inlet pulse to produce the desired gas flow. The inlet pulses may be formed by varying the time the orifice is open, or by fixing the times to establish an incremental flow, then counting cycles to obtain a desired flow rate.

DETAILED DESCRIPTION

Figure 1:
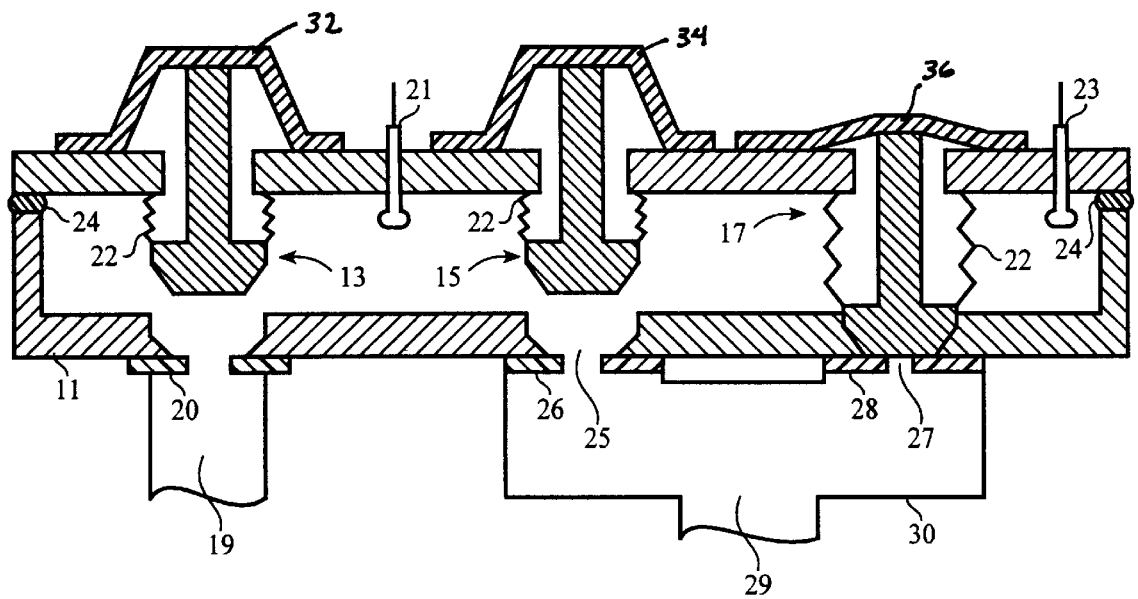
FIG. 1 is a side plan view of a flow controller for gases in accordance with the present invention.

With reference to FIG. 1, a gas tight enclosure 11 with a valve 13 gating the inlet orifice 20 and multiple valves 15 and 17, gating the outlet orifices 25 and 27. A higher gas pressure always exists at the inlet manifold 19 than in the outlet manifold 29. The housing has upper and lower portions connected by seal 24. Provision is made for measuring the pressure and temperature within the enclosure using pressure transducer 21 and temperature transducer 23. Each outlet orifice, as well as the inlet orifice, has a fixed area and provides passageway for the gas to escape the enclosure to the outlet destination through outlet manifold 29. The orifices differ in area through the different outlets so that small to large flow values can be accommodated from the single enclosure. Flow through the outlet manifold is uniquely determined by (1) the area of the outlet orifices, (2) the pressure and temperature of the gas inside the enclosure as well as (3) the gas's molecular weight and heat capacities.

Although any orifice of a fixed area can be used, the preferred orifices are made out of a small sliver of single crystal silicon material into which an opening has been etched using etchants that have preferred etch rates depending upon the crystal axes. The silicon slivers 26 and 28 are fit onto openings in housing 11 which lead into outlet 29. The silicon sliver 20 fits onto the opening in housing 11 which leads into inlet 19.

For example when the crystal orientation of the surface of a silicon sliver is parallel to the silicon (100) plane and the etchant is a concentrated solution of potassium hydroxide (KOH), the etchant will evolve facets of the slower etching (111) plane inside the opening. The (111) plane becomes revealed and forms a precise angle of 57° with respect to the (100) plane so that if etching is initiated from an inert mask opening on the top part of the sliver the orifice so formed is considerably wider at the top than at the bottom. However, the profile of the resulting orifice leaves a very sharp angle between the backside surface and the opening creating a knife edge orifice. Since the sliver is a single crystal of silicon the orifice is defined by crystal planes and in the case of the silicon crystal structure the resulting orifice opening is perfectly square and its area is easily determined from measuring the opening sides from an optical microscope. Such an extremely fine edge orifice is desirable in that it minimizes the effect of sidewalls on gas flow through the orifice opening and provides for reproducible flow results from sample to sample. The orifices may have different sizes, with orifice 25 noticeably larger than orifice 27.

A very high speed and accurate electrically operated valve actuation system is used. The preferred embodiment utilizes valve actuators 32, 34 and 36 made out of a shape memory retentive material that when heated springs into a different shape. When the material is cooled it returns to its existing shape. A shape memory alloy comprising a mixture of Ti and Ni is employed and formed into very thin strips, just a few thousands of an inch thick. Reshaping can be accomplished in less than $\frac{1}{20}^{th}$ of a second using commercially available structures. Actuators less than one-quarter inch thick can typically exhibit relatively large stroke distances and are inexpensive to manufacture.

Microminiature valve actuators of this type have been disclosed in U.S. Pat. No. 5,325,880 to Johnson and Ray, incorporated by reference herein. The shape retentive membranes open or close the underlying orifices upon application of heat. Another attribute of shape memory valve actuators is that the amount of shape change is proportional to the amount of heat injected. A thin resistive wire heater atop the thin film is used to transfer heat to the Ti—Ni actuator. The wire handles enough current to cause the actuator shape change in a millisecond or so. This feature can be incorporated into the process of the initial opening of the outlet valve in the case the enclosure has an over-pressure condition at the flow start. Restricting the opening area in such a manner allows the present invention to achieve accurate flow during the initial phase of flow start and solves the "overshoot" condition.

Note that the gas molecules contact only the internal surfaces of the enclosure. Bellows 22 made of thin metal sheets separate the poppets from the process gas. This is important because many of the process gases used are potentially reactive with the shape memory material. On the other hand, the pressure sensor and the thermocouple do have contact with the gas since generally these can be passivated or shielded. The bellows can also provide the spring force to counter the shape memory force in order to restore a valve to a normally closed position when the shape memory force is relaxed.

A novel feature of the invention is control of pressure within the enclosure and hence the flow through the outlet orifices by rapid sequential opening and closing of the inlet and outlet valves in precise combinations of single orifice openings and closings. To accomplish this an electronic device controller is employed in concert with the enclosure mechanism. This device controller employs electronic control circuitry well known in the art for sensing and actuating controls.

Figure 2:
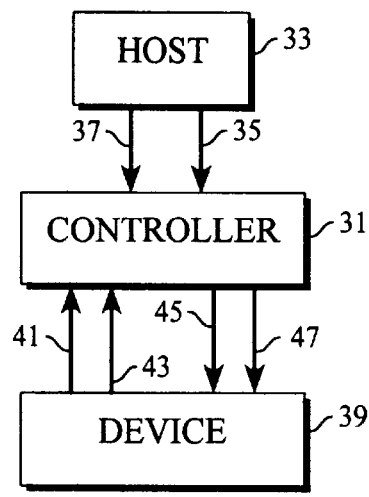
FIG. 2 is an electrical plan of a control system for the apparatus of FIG. 1.

Referring to FIG. 2, an electrical device controller 31 communicating with and external or host controller 33 from which it receives signals corresponding to the amount of flow desired, transmitted on line 35, and the start of flow and the end of flow, transmitted on line 37. For example, the host controller might change an electrical connection on line 37 from 0V to +5V to signal the start of flow and it might change this line back to 0V to signal the end of flow. At the same time as signaling the start of flow the host controller might change the electrical connection on line 35 from 0V to some fraction of 5V to signal the corresponding fraction of maximum flow so desired.

From the host signal corresponding to the desired flow, and with built-in constants a, b, $a_s$, and $b_s$ that describe the flow from the enclosure, as described below, the device controller can calculate the desired set point pressure inside the enclosure that corresponds to the desired flow through a selected orifice or combination of orifices. The gas species is assumed known. The device controller also receives signals from the enclosure with regard to the pressure and temperature of the gas contain therein along lines 41 and 43, respectively. The device controller also sends signals to the flow controller device 39 that actuate the opening and closing of the inlet and selected outlet valves, along lines 45 and 47, respectively. The device 39 is the apparatus of FIG. 1. If the pressure inside the enclosure is above the said set point pressure the controller makes the outlet valve open first, depleting the gas in the enclosure until it reaches the set point pressure. Conversely, if the enclosure's pressure is below the said set point the inlet valve opens first followed by the outlet valve. In the former case the outlet valve may be constrained to open slowly presenting a valve cross-sectional area restriction that offsets to the over-pressure situation. In the latter case it is just a momentary delay to the start flow condition.

Once the set point pressure has been obtained the device 39 uses an outlet valve in a wide open condition, not restricting flow, and the inlet valve operating in sequence of rapid opening and closing modes. With such a pulsatile method for the inlet valve the valve's actuator opens and closes the valve's seal several times per minute. With each open/close cycle the inlet releases a precise pulse of gas molecules into the enclosure. The exact number of open/close cycles, as well as the magnitude of the open/close times themselves are determined uniquely by the set point pressure desired within the enclosure, the gas temperature, its density and the outlet orifice area. The combination of these variables allows controller 31 to compute the precise flow of gas through those outlets that are open. Since orifice 25 is several times the size of orifice 27, the controller can produce large volumes of flow using large orifice 25 or small volumes of flow using small orifice 27 all from the same enclosure.

It will be recognized that inside the enclosure the pressure is falling during the closed portion of the inlet valve cycle, and conversely the pressure is rising during the open part of the cycle. In the steady state the magnitude of the increase over the set point pressure equals the magnitude of the decrease under the set point. However, if the volume of the enclosure is chosen so that its value is large compared to the total amount of flow during the open part of the cycle and/or the cycle time is less than one second, the pressure change is small. Therefore, this leads to a minute oscillation of the outlet flow and the downstream system will experience a only small time variation of flow. The variation is further reduced because the released gas molecules go through a process of adsorption and desorption on the downstream surfaces but the desorption direction is random so some of the released molecules diffuse upstream.

Figure 3:
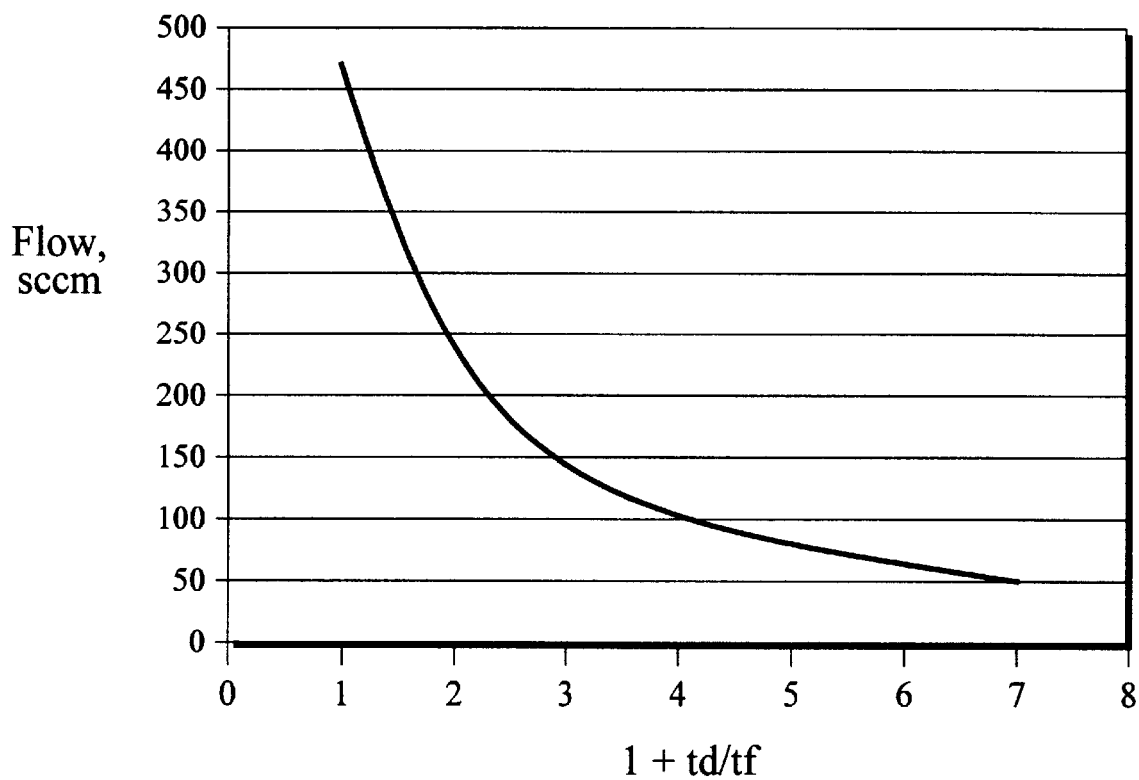
FIG. 3 is a plot of flow of nitrogen gas versus the fill time and drain time parameters $(1+t_d/t_f)$ where $t_d$ is the drain time and $t_f$ is the fill time in a simplified apparatus of the type shown in FIG. 1.

In FIG. 3 we have set up the enclosure volume of approximately 1000 cm³ with a single outlet orifice of area 0.15×0.15 mm² and an inlet orifice of 0.36×0.36 mm². A controller was set to operate the inlet valve to open for a fixed period $t_f$ (fill time) and to close for a time $t_d$ (drain time). The figure displays the measured flow of nitrogen gas at room temperature through the outlet orifice versus the value of $(1+t_d/t_f)$ over the range of 1 to 7. The following table shows the individual $t_d$ and $t_f$ values in milliseconds.

TABLE 1

| 1 + $t_d/t_f$ | $t_f$ | $t_d$ |
|---|---|---|
| 1 | 1000 | 0 |
| 1.08 | 600 | 50 |
| 1.125 | 400 | 50 |
| 1.166 | 300 | 50 |
| 1.2 | 250 | 50 |
| 1.25 | 200 | 50 |
| 1.333 | 150 | 50 |
| 1.5 | 100 | 50 |
| 1.5 | 100 | 50 |
| 1.6 | 100 | 60 |
| 1.7 | 100 | 70 |
| 1.8 | 100 | 80 |
| 1.9 | 100 | 90 |
| 2 | 100 | 100 |
| 2 | 100 | 100 |
| 2.5 | 100 | 150 |
| 3 | 100 | 200 |
| 3.5 | 100 | 250 |
| 4 | 100 | 300 |
| 4.5 | 100 | 350 |
| 5 | 100 | 400 |
| 6 | 100 | 500 |
| 7 | 100 | 600 |

Note that the pulse widths, both $t_f$ and $t_d$, are variable. This means that $t_f$ and $t_d$ can be varied over time as feedback indicates flow errors.

It is seen from the figure that a smooth sequence of flow has been demonstrated. Here, flow is measured in units of cubic centimeters per minute where the gas is at standard values of temperature and pressure (sccm). Most importantly, the figure shows nitrogen flow range from 50 sccm to 463 sccm or a factor of more than 9 times.

Although the flow range achieved with reference to FIG. 3 was from a single orifice, multiple orifices of differing size can be utilized to increase the flow range even further than shown in that figure. The flow through any orifice is proportional to the area of that orifice so that if the enclosure where to have two or more outlets a much wider range of flows can be accommodated. For example, if the orifice opening were to quadruple in area, double the length of the sides, then 4 times the flow would result from that orifice. In this specific case the flow could range from 50 to 463 sccm with the smaller orifice open or it could range from 200 to 1852 sccm with the second orifice open. In fact with both orifices open the flow would range from 250 sccm to 2315 sccm.

Figure 4:
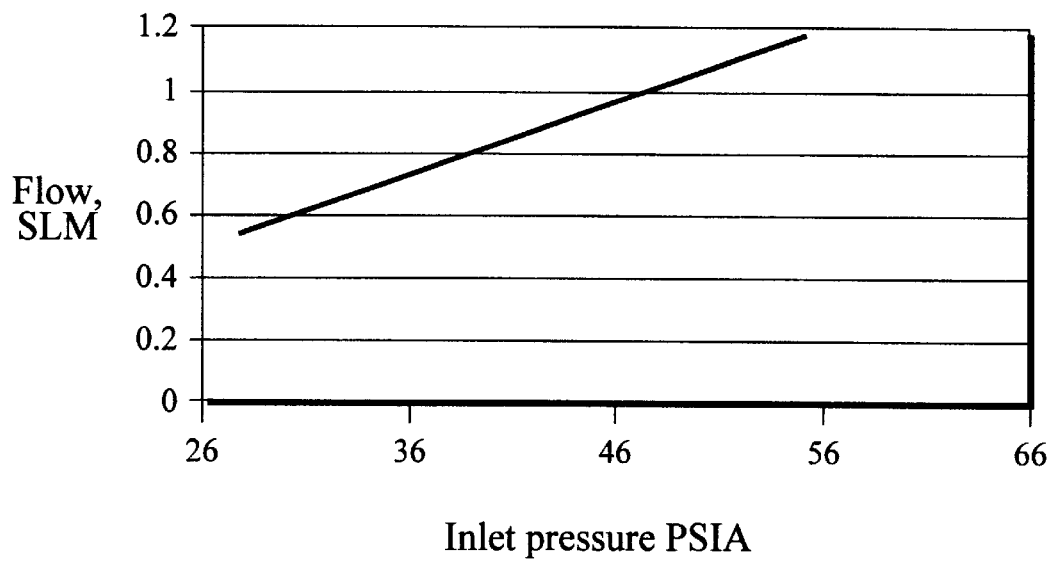
FIG. 4 is a sonic regime plot of flow versus pressure in an orifice etched in silicon for use in the apparatus of FIG. 1.

FIG. 4 shows a plot of nitrogen gas flow through an orifice of 28,0000 $\mu m^2$ area when measured versus the inlet side pressure. In this case the outlet side pressure is 15.1 psia. A key point to note is that flow is accurately described by the equation $Q=a_s P+b_s$ where Q is flow as measured in typical units of cubic centimeters per minute where the gas is at standard values of temperature and pressure. Also, P is the pressure inside the enclosure measured in pounds/square inch absolute and $a_s$ and $b_s$ are constants of the gas, its temperature, and the orifice. Note, for high accuracy it is necessary to include the constant $b_s$.

Figure 5:
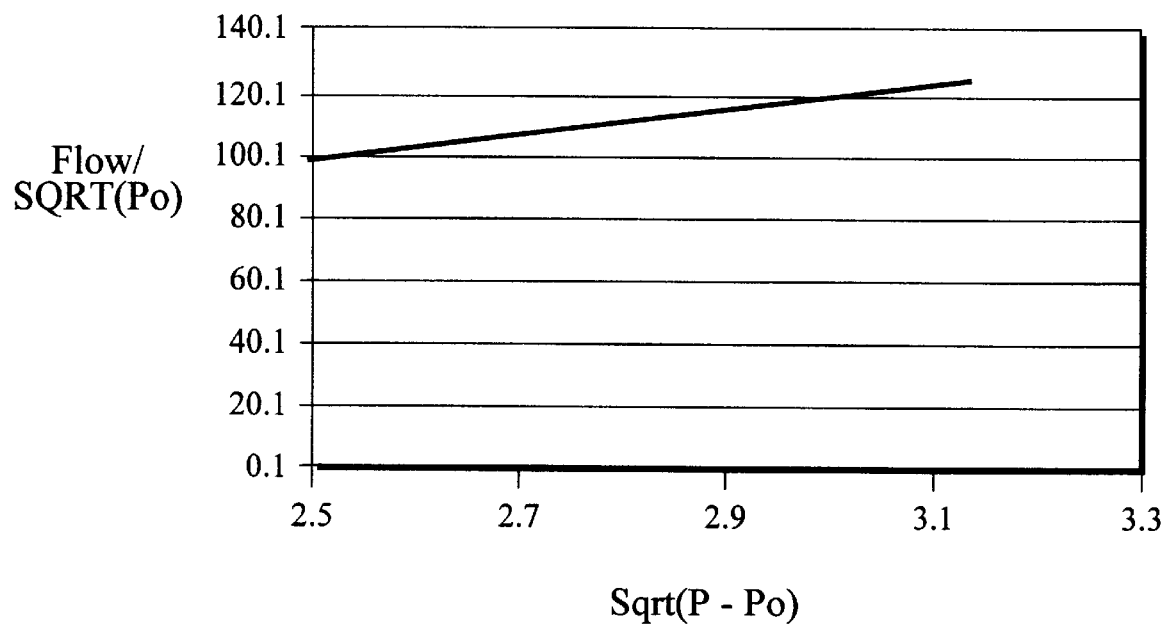
FIG. 5 is a sub-sonic regime plot of flow versus square root of pressure difference in an orifice etched in silicon for use in the apparatus of FIG. 1.

Similarly, FIG. 5 shows flow through the same orifice but when the pressure inside the enclosure is less than two times the pressure downstream from the outlet. Flow in this regime differs because the gas is traveling at sub-sonic speeds through the orifice. However, again we can see the flow is accurately described by a linear equation but this time of the form $Q/\sqrt{Po}=a\sqrt{(P-Po)}+b$ where Po is the pressure downstream from the outlet. Again a and b are constants of the gas, its temperature and the orifice area.

Figure 6:
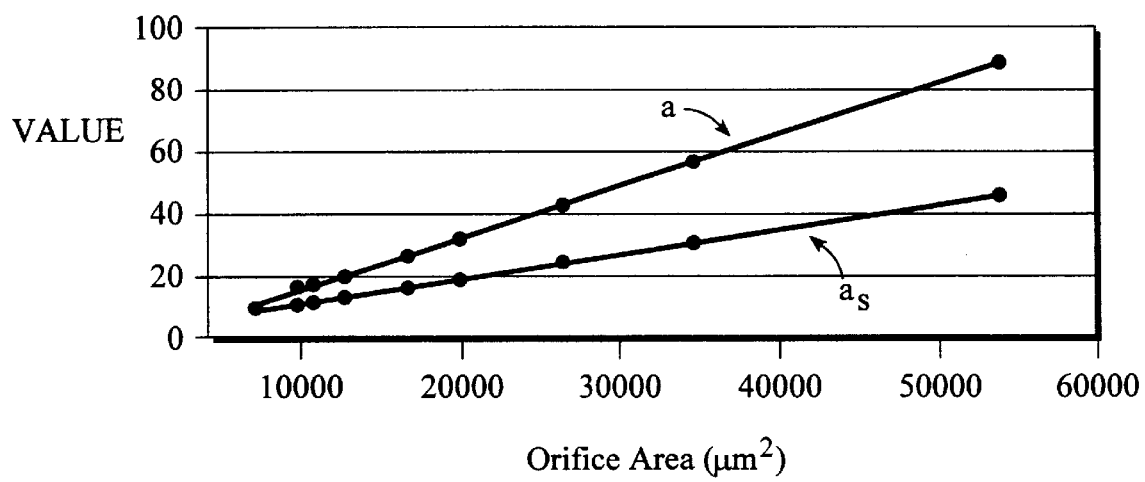
FIG. 6 is a plot of gas law parameters versus orifice area for the type of orifice described in FIGS. 4 and 5.

We have measured the flow of nitrogen gas through many orifices of varying openings made in a similar fashion by methods described above. All follow the linear properties involving the parameters a, b, $a_s$ and $b_s$. FIG. 6 shows a plot of a and $a_s$ versus orifice area for nitrogen gas at room temperature for orifices formed in slices of single crystal silicon.

In operation of the flow controller, both $t_d$ and $t_f$ are independent variables. The desired flow can be obtained by choosing a unique combination of them. In the example used in this work (see Table 1) the minimum cycle length was 150 milliseconds ($t_f$=100 milliseconds+$t_d$=50 milliseconds) and the maximum was 700 milliseconds ($t_f$=100 milliseconds+ $t_d$=600 milliseconds). Assuming the clock hardware comprised in the device controller can discriminate times of 1 millisecond this gives the device as a whole an accuracy ranging from one part in 150 to 1 part in 700.

The importance of a highly linear system for flow can appreciated in the desire for accuracy. The data gathered in FIGS. 4 and 5 are within +/−0.3%. Knowing just the four constants $a_s$, $b_s$, a and b that are specific to a particular orifice/gas combination means the controller can be programmed to achieve this set point control within the desired accuracy. The only additional conditions required are to also measure the pressure and temperature within the enclosure to the same precision.

The operation of the invention may be seen from the following example. Suppose the application needed nitrogen gas to have an outlet flow into a vacuum (designated $Q_d$) equal to 400 sccm at room temperature when the inlet or line pressure is 30 psia. Let one of the outlet orifices have an area of 150×150 $\mu m^2$. Under these conditions the flow through the orifice will be sonic and from FIG. 6 the $a_s$ parameter for this orifice is 17.9. The $b_s$ parameter is −70. From the relationship $P=(Q_d-b_s)/a_s$ the set point pressure to achieve the desired $Q_d$ flow is 26.2 psia. Therefore, at the inlet orifice the flow into the enclosure will be subsonic. If the inlet orifice is 400×400 $\mu m^2$ again from FIG. 6 we see that a=251. The b parameter is −148. Therefore, the inlet flow into the enclosure ($Q_f$) is 1747 sccm. The inlet valve will be pulsed open for a time $t_f$ and closed for a time $t_d$ so that approximately $Q_f \times t_f = Q_d(t_f+t_d)$ leading in this case to $(1+t_d/t_f)$=4.37. If the minimum fill time $t_f$ is 50 msec this means $t_d$ is 168 msec and the cycle time is 218 msec. To operate the invention the device controller will send a signal to the outlet valve to pull open and the inlet valve to pulse open in this fashion.

The invention, as designed, has the capability of automatic adjustments. For example, suppose the gas flowing was some species other than nitrogen. In that case the a, b, $a_s$, and $b_s$ parameters are multiplied by $(M_{N2}/M_{gas})^{1/2}$ where M is the respective molecular weight of the gas or nitrogen. Similarly for temperature. Here the parameters are multiplied by $(T_{room}/T_{actual})^{1/2}$ and the ratio determined from the temperature sensor. The invention can also adjust for variation of the inlet pressure. In the example above the inlet or line pressure was 30 psia. If it were different then $Q_f$ would differ from that calculated above. However, the set point pressure is determined precisely by the outlet conditions. Therefore, the reading from the pressure sensor can be used as a feedback to adjust the $t_d$ and $t_f$ values to compensate for the manifold pressure variation. As an alternative it would be possible to add a secondary pressure sensor to monitor the inlet line directly and perform the $Q_f$ calculations without inferring the inlet pressure.

It is, however, desirable to measure the enclosure's pressure directly as shown in FIG. 1 in order to adjust the start-flow process. For example, at the start of flow if the pressure is below the calculated set point pressure then the device controller will command the inlet valve to pulse open for a few cycles before opening the outlet valve. Conversely, if the enclosure's pressure is too high compared to the set point pressure the device controller will command the outlet valve to crack open first and drain gas from the enclosure before opening the inlet valve. Once the enclosure's pressure has reached the set point pressure the inlet valve can be activated.

It will be appreciated that fast acting (order of milliseconds) valves are desirable for the operation of this invention. For this reason we have found that actuators made of shape memory material are desirable but other fast acting valves could implement this system as well.

Due to the miniature size of the shape memory valves it is easy to accommodate more than one outlet orifice in a relatively small enclosure. This is useful to extend the range of the flows feasible from the apparatus. For example, suppose the flow application required a flow of 2 standard liters per minute (2000 sccm). The maximum flow for the 150 $\mu$m×150 $\mu$m orifice is 467 sccm (inlet valve open continuously and line pressure=30 psia). If the second outlet orifice had an opening of 400 $\mu$m×400 $\mu$m, and using the same calculations as above, the set point pressure will be 20.3 psia and $t_d/t_f$ will be 0.427. In this case $t_d$ is the minimum 50 msec parameter so $t_f$ is 117 msec or a cycle time of 167 msec. With both orifices in the same enclosure it is a simple matter for the device controller to open the correct outlet valve upon detecting the appropriate flow desired signal from the host controller (FIG. 2). The flow range can be extended further by utilizing both outlet valves in the open state.

There is an alternative method of pulsatile control that offers the possibility of higher accuracy than the variable $t_d$ and $t_f$ considered above. In this alternative case we use very short $t_f$ and $t_d$ but fix their values. If we use a $t_f$ of 50 milliseconds and a $t_d$ of 10 milliseconds we have 60 milliseconds per cycle or 1000 per minute. However, in a series of such cycles the device controller can decide if any individual cycle will be active, meaning the valve actually opens during the designated $t_f$ time period. If the cycle is active the valve will release a precise number of molecules through the inlet orifice. The exact number of molecules depends upon the gas inlet pressure and temperature, its molecular weight, the orifice size and the pressure inside the enclosure 39. To control the set point pressure it then becomes a matter of deciding for each minute of flow how many open-valve cycles will be activated. Since there are 1000 cycles per minute this method of pulsatile control has a theoretical accuracy of one part in one thousand.

This pulsatile method requires a decision regarding how to distribute in time the activated valve-open cycles. Clearly, the optimum choice is to distribute them as evenly dispersed as possible. For example, if 500 valve-open cycles were required to flow the desired set point the controller would open the valve every other cycle (50% duty rate) because there are 1000 cycles per minute.

Indeed, one way of insuring even distribution is to program one suppressed cycle out of an even integer of cycles for the valve-open or valve-close conditions. Therefore, there would also be the one out of every three cycles, one out of every four cycles, and so forth, up to one out of ten cycles (10% minimum). This would give access to duty cycles of 10%, 11.1%, 12.5%, 14.3%, 16.7%, 20%, 25%, 33.3%, and 50%. Conversely, if we programmed one close-valve condition on an otherwise 100% duty cycle gives us access to 90%, 88.9%, 87.5%, 85.7%, 83.3%, 80%, 75%, 66.7%, and 50%.

The simple timing system, one cycle out of a repeating number of cycles, might satisfy many applications even though limiting the number of set point flows available to the system. One way to increase the flow points available is to allow the controller the ability to impose a correction override command regarding whether any particular cycle is activated or not. For example, if the nominal duty cycle was 50% but the override command did not activate one cycle out of every 20, then the over one minute there would be 450 valve-open cycles rather than 500. By extrapolation of this technique it will be possible to reach any practical cycle number required.

Finally either method of pulsatile control can be applied to the outlet valve as well as the inlet valve. If the outlet valve pulses this is the equivalent to reducing the average flow from the enclosure. In principle this adds an additional variable to the system that could allow more precision. However, the cost is that the flow is more uneven than in the normal operation wherein the outlet valve is wide open (not restricting flow) and the enclosure itself has the effect of moderating the pulse method of the inlet valve. However, pulsatile control of the outlet valve may prove beneficial as an alternative solution to the overshoot issue discussed above. In this case there is an over-pressure situation inside the enclosure and flow would be too high during the time period of starting flow. The design choices are to open the valve slowly (effectively reducing the valve's cross sectional area and thus slowing flow) or to apply the pulsatile equivalent of reducing flow. Either method applies during the first few seconds of flow start.

What is claimed is:

1. A flow controller comprising,
    a housing of known volume having an inlet orifice connected to a fluid supply and an outlet delivering a fluid supply, the inlet pressure greater than the outlet pressure, the outlet having a crystalline membrane defining an orifice of precisely known dimensions, the housing supporting reciprocating orifice closure members driven by actuators opening and closing the inlet orifice and the outlet orifice upon command,
    a pressure and a temperature transducer mounted in the housing, the transducers productive of electrical signals representing pressure and temperature in the housing,
    a device controller electrically connected to the actuators and receiving the electrical signals from said transducers and from an input set point and flow start and end signals, the device controller signaling the actuators to open and close the inlet orifice and outlet orifice whereby a desired fluid flow through the housing is maintained.

2. The controller of claim 1 wherein the fluid is a gas.

3. The controller of claim 1 wherein the actuators are shape retentive membranes instantaneously distorted by application of heat.

4. The controller of claim 1 wherein said crystalline membrane is a portion of a silicon wafer.

5. The controller of claim 4 wherein said orifices are defined along crystal planes of the silicon wafer.

6. The controller of claim 1 wherein the reciprocating orifice closure members are poppets.

7. The controller of claim 6 wherein each poppet has a stem surrounded by a bellows leading out of the housing whereby the stem is isolated from the interior of the housing.

8. The controller of claim 1 wherein the housing has a second crystalline membrane defining a second outlet orifice, the housing supporting a further orifice closure member.

9. The controller of claim 8 wherein the size of the second outlet orifice is different from the first outlet orifice.

10. The controller of claim 8 wherein the second outlet orifice is defined along crystal planes of silicon.

11. The controller of claim 8 wherein the first and second outlet orifices operate independently, being driven by the device controller, wherein the first and second outlet orifices provide small and large amounts of mass flow out of the housing.

12. The apparatus of claim 1 further comprising temperature and pressure sensors disposed in said housing, the sensors electrically communicating with the device controller.

13. The apparatus of claim 1 wherein the housing comprises a plurality of outlet orifices.

14. The apparatus of claim 6 wherein bellows surround each of the poppets interiorly of the housing, the bellows having a spring force opposing force from the actuators.

15. A method of controlling gas flow,
providing a housing with a gas inlet orifice and a gas outlet orifice, the gas inlet orifice communicating with a gas supply with a pressure greater than that in the housing,
modulating gas pressure at the gas inlet orifice about a setpoint wherein pulses of gas enter the housing,
modulating gas pressure at the gas outlet aperture about said setpoint wherein pulses of gas exit the housing,
coordinating the duration of the outlet pulses with the inlet pulses in a time variable manner wherein the duration of said outlet pulses produce the desired gas flow.

16. The method of claim 15 wherein the modulating of gas pressure is by opening and closing orifices in the housing.

17. A method of controlling gas flow,
providing a housing with a pulsatile gas inlet orifice and a gas outlet orifice, the gas inlet orifice communicating with a gas supply with a pressure greater than that in the housing,
determining a gas flow rate at the gas outlet orifice for gas at various temperatures and pressures for an outlet orifice of specified size,
calculating a set point pressure within the housing for a selected gas outlet flow at a specified temperature and pressure in view of the determined flow rate through said outlet aperture, and
determining a fill time ratio $t_d/t_f$ expressing the time the inlet valve is open, $t_d$, relative to the time it is closed, $t_f$, for inlet gas pulses.

18. A method of controlling gas flow,
providing a housing with a pulsatile gas inlet orifice and a gas outlet orifice, the gas inlet orifice communicating with a gas supply with a pressure greater than that in the housing,
determining a gas flow rate at the gas outlet orifice for gas at various temperatures and pressures for an outlet orifice of specified size,
calculating a set point pressure within the housing for a selected gas outlet flow at a specified temperature and pressure in view of the determined flow rate through said outlet aperture,
for a measured fill time $t_f$ and a drain time $t_d$, where $t_d$ is less than $t_f$ for even gas flow at specified temperatures and pressures, determining the number of $t_f$ and $t_d$ cycles per minute to achieve a selected flow rate, and
counting the number of $t_d$ and $t_f$ cycles to achieve the selected flow rate.

* * * * *